Sept. 10, 1957     C. R. NICKOLS     2,805,922

SATURATOR

Filed Sept. 25, 1951

Inventor
Chester R. Nickols
Andrew F. Wintercorn
Atty.

United States Patent Office 2,805,922
Patented Sept. 10, 1957

2,805,922

SATURATOR

Chester R. Nickols, St. Charles, Ill.

Application September 25, 1951, Serial No. 248,210

7 Claims. (Cl. 23—267)

This invention relates to an improved saturator or brine tank especially designed and adapted for use in connection with a water softener, but adapted for use wherever a salt or other brine of similar concentration is required.

In brine tanks used heretofore, the salt is dumped into the bottom of the tank onto a gravel bed in which a slotted suction pipe for removal of brine is embedded, and the tank is filled with water nearly to the top. Hence, such brine tanks may be properly described as of the "wet salt storage type." That type has a number of serious objections, the first and foremost of which is that there is no telling for certain whether enough salt is present to produce a saturated brine solution, and if there is not enough and the tank is filled with water one cannot then add the required amount of salt without removing an equivalent volume of water or brine of whatever concentration is present. As a result, softeners are often put through the cycle of regeneration with brine of insufficient concentration and in that way a softener of otherwise good design and construction will not work right and may be subjected to unfair criticism. Another objection to the wet salt storage type is that the water collects dust and dirt much more readily than dry salt, and there is, moreover, a tendency for crystallization of salt on the walls of the tank upwardly from the brine level and down the outside of the tank and this accumulation gradually grows, making the brine tank more and more unsightly and unsanitary with age. A further objection to that type is that the non-soluble materials in commercial softener salt, which run anywhere from ½ of 1% up to as high as 2%, settle to the bottom of the brine and are eventually drawn into the softener, the brine being withdrawn as mentioned before from the bottom of the brine tank. These nonsoluble materials, being heavier than the zeolite in the softener tank, had a tendency to accumulate in the bottom of the bed and act as a binder and thereby formed an obstruction to the back-wash flow.

It is, therefore, the principal object of my invention to provide a dry salt storage type saturator or brine tank in which a bed of dry salt is supported on top of an open-bottom drum in elevated relation to the bottom of the tank above the brine, only the lower portion of the salt bed being in contact with the water so as to provide a zone in which salt dissolves, the bottom of the salt bed being in (preferably less restricted) contact at a lower level with the water and, at a higher level, in (preferably more restricted) contact with the water, the one salt to water contact being centrally of the body of water and the other salt to water contact being annularly of the body of water, so that a natural circulation is set up as the salt dissolves, the brine thus formed being heavier and moving downwardly and displacing the water or brine of lesser concentration upwardly, and such circulation continuing until the water has become fully saturated and is 100% brine. With the dry salt storage type saturator or brine tank the serious objections mentioned above are avoided because only dry salt is exposed to the atmosphere and there is, therefore, no crystallization and salt creepage upwardly and onto the outer side of the tank. The tendency to collect dust and dirt is also greatly reduced. Furthermore, the user can tell at a glance when the salt supply is low and should be replenished, thus eliminating all of the guess-work that went with the wet salt storage type, and there is never any problem connected with adding the salt in so far as the removal of water or brine to make room for the salt is concerned. The supplying of salt, moreover, does not have to be in any way coordinated with any of the regeneration operations. With the wet type it was necessary to instruct the operator to be sure that after each regeneration a certain amount of salt was left undissolved in the tank, and then, if any salt had to be added, that had to be done before the brine tank was filled. Furthermore, with this dry type it is practical to withdraw the brine from the tank above the bottom thereof so that a sump space is left in which the non-soluble materials may separate out and be collected for removal from time to time, instead of being drawn into the softener with the brine.

The invention is illustrated in the accompanying drawing, in which—

The same reference numerals are applied to corresponding parts in these two views.

Figure 2:
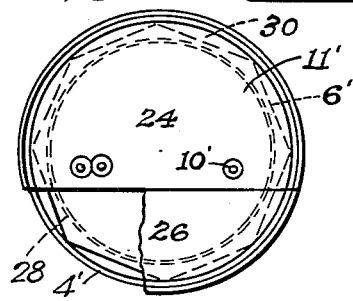
Fig. 2 is a plan view of Fig. 1 on a smaller scale.

Referring to the drawing, the saturator or brine tank 4' is of cylindrical form and has an open-bottom drum 28 therein supported by means of downwardly projecting feet 29 on the bottom 9' of the tank in elevated relationship thereto defining a salt compartment 7' in the tank above the drum and a brine compartment 8' in the lower portion of the tank inside the drum. A lid 11' is provided on the top of the tank in two sections, namely, a larger fixed section 24 fastened to the tank by bolts 25, and a smaller removable section 26, removal of which leaves an opening in the top of the tank through which salt can be poured into the dry salt storage compartment 7'. The fixed lid section 24 has projecting downwardly therefrom a pipe 10' that extends through a central opening 14 in the top plate 6' on the drum and terminates short of the bottom 9', as shown, this pipe serving to deliver water to the brine compartment 8' and also to withdraw brine therefrom, while leaving a sump or sludge space in the bottom of the tank to collect the non-soluble materials, which in commercial softener salt is found to run anywhere from one-half to one percent up to as high as two percent. The fixed lid section 24 also forms a support for a well tube 27 that extends downwardly from the lid through the salt compartment 7' and through a hole in the top plate of the drum. The top plate 6' is suitably secured to the drum and, as indicated in Fig. 2, is of octagonal form and has contact with the inside of the tank 4' at the eight points of the octagon, so as to hold the drum in spaced concentric relation to the walls of the tank. In that way narrow spaces are left, as indicated at 30, between the periphery of the plate and the wall of the tank to allow circulation to occur and let salt settle into and fill the annular space 31 around the baffle 28. The well tube 27 has two electrodes 32 and 33 suspended inside it from the fixed section 24 of the lid and reaching levels near the top and bottom of the brine compartment, respectively, electrode 33 being above the lower end of the pipe 10'. Water is supplied to the tank 4' when the multiport valve (not shown) connected with the pipe 10' and the softener tank, as well as with a source of raw water supply under pressure and a drain, is moved to a "refill" position or "service" position, and the water is shut off when it reaches the level of the line a′ b′. In a manually operated softener a separate hand operable shut off valve is provided for that purpose, otherwise a float control valve may be provided. When the aforesaid multiport valve, in the regeneration of the softener, is shifted to the salting position, at which time an injector nozzle in the valve has the venturi portion thereof communicating with the pipe 10′, while raw water is discharged under pressure through the nozzle to entrain brine with the water and carry it into the softener tank for passage through the bed of water softening mineral therein for regeneration thereof, the valve remains in the salting position until the brine level drops below the lower end of the electrode 33, whereupon the valve is automatically shifted from the salting position to the "rinse" position, but not before a predetermined amount of brine has been withdrawn from the brine compartment 8′. The valve remains in the "rinse" position until the brine drawn from compartment 8′ is replaced by adding fresh water through pipe 10′, until the terminal 32 is reached, whereupon the valve is returned by power to the "service" position. As disclosed and claimed in a copending application, Serial No. 248,714, filed September 28, 1951, the length of the rinse operation can be measured in terms of how long it takes to refill the brine compartment at a certain measured rate of flow, and, inasmuch as flow rates change in proportion to changes in pressure and, therefore, a time control cannot insure the passing of a certain volume of rinse water through the bed for a good and thorough rinsing, the tieup of timing the rinse by the length of time it takes to refill the brine tank insures a good and thorough rinsing regardless of pressure fluctuations, because a drop in pressure affects the refilling as much as it does the rinsing and will mean only a slightly longer rinse for the same volume of rinse water to flow through the bed and the predetermined amount of water to enter the brine compartment. The cover plate 16′, which is held in concentric relation to the opening 14′ by the pipe 10′ extending with a close fit through a center hole in the plate 16′, defines restricted openings between the top plate 6′ and cover plate 16′ between downwardly embossed projections 33′ that are provided on the cover plate 16′ for support thereof in closely spaced relation to top plate 6′ to support the salt bed in compartment 7′ but allow circulation, as indicated by the arrows, there being an outflow of water or brine of lesser concentration from the brine compartment 8′ as brine descending in the annular space 31 and entering the bottom of the brine compartment 8′ from all sides displaces the aforesaid water or brine of lesser concentration upwardly through the opening 14′.

Figure 1:
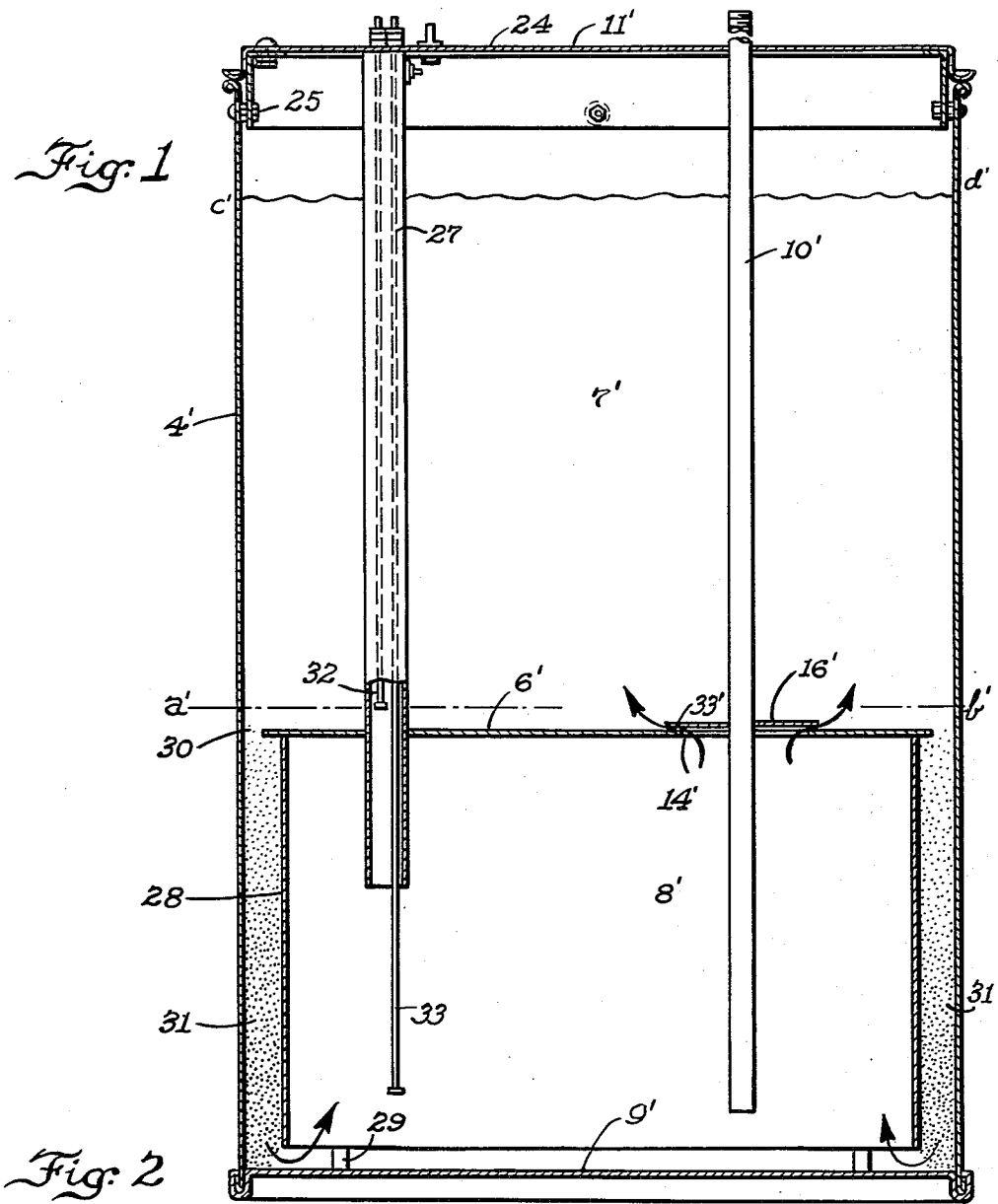
Fig. 1 is a central vertical section through a saturator or brine tank made in accordance with my invention, incorporating the open-bottom drum for support of the salt bed.

In operation, assuming that the salt compartment 7′ is filled to about the level of the line c′ d′ with any grade of salt now commonly used in water softener brine tanks, and that the brine compartment 8′ is filled with water up to the level of line a′ b′, water is in contact with only the lower portion of the bed of salt above the top plate 6′ of drum 28 and whatever salt may find its way down in the space 31 between the side walls of the drum 28 and side walls of the tank, and hence the upper portion of the salt bed remains dry. The salt dissolved by the water forms brine and the brine being heavier than water flows downwardly in space 31 and displaces water upwardly in brine compartment 8′ through the opening 14′ and the restricted openings under cover plate 16′ between the projections 33′. Of course, the water displaced upwardly comes in contact with the bottom portion of the bed of salt, thereby forming more brine as the salt dissolves. This circulation, indicated by the arrows in Fig. 1, continues until the water in the brine compartment 8′ becomes saturated brine when, of course, no more salt can go into solution, the rate of circulation gradually decreasing as the saturation point is approached. The pipe 10′, which is used in refilling the compartment 8′ with water after the brine has been withdrawn through the same pipe, has its lower end located well above the bottom 9′ of the tank to provide the sump or sludge space in the bottom to collect the non-soluble materials. With the old wet type brine tanks or saturators these non-solubles were drawn into the softener because the brine was removed from the bottom of the unit. These non-solubles, being heavier than the zeolite mineral in the softener tank, had a tendency to accumulate at the bottom of the zeolite bed where they acted as a binder, and thus built up an obstruction to flow, which was a serious disadvantage especially in back-washing. With the present construction these non-solubles separate out in the sump in the brine compartment 8′ below the level of the pipe 10′ and can, if necessary, be removed from time to time. Anyone familiar with the operation of water softeners will at once appreciate the many advantages of the dry type salt saturator. Any time there is room for additional salt in the upper compartment 7′ it can be added. The addition of salt has no relationship to the amount of water or brine in the brine compartment 8′. So long as the salt level is maintained above the water line a′ b′ salt will be visible in the salt compartment 7′. The unsightly scum and sludge common to the wet type saturator is not formed in the pressure type, whatever impurities there may be being collected in the sump below the level of the pipe 10′. This dry type saturator is particularly advantageous when used in connection with automatic softeners because with the wet type of saturators certain serious difficulties were presented which the dry type avoids. For instance, the automatic operation was thrown completely out of step if there was not enough salt present and the softener under automatic control had its brine tank filled to the usual level on the wrong assumption that the necessary salt was present, which is something that is apt to happen and does happen too frequently, because the user can only guess whether there is enough salt present in the case of a wet type saturator, whereas with the present dry type, he can tell at a glance how much salt is present, and can add whatever amount may be needed, and he can do this at any time, because the filling of the salt compartment is not related in any way to the refilling of the brine compartment. On the other hand, in order to replenish the salt supply in the conventional wet type saturator, where it is being used in conjunction with an automatic softener, unless the operator is there when the softener goes through its regeneration cycle, and puts in the salts as soon as the brine has been withdrawn, he cannot add salt thereafter without first removing enough brine to make room for the salt. In any event, the procedure is not satisfactory, because a normal brine draw for a single regeneration does not leave enough space in the saturator to enable the operator to add as much salt at one time as he might like to. On the other hand, if the operator seeks to avoid removing any brine in order to add salt and still avoid causing the brine tank to overflow, he would find that he could not add enough to make up for what was used even in a single regeneration, and as a result the brine present in the tank would necessarily be far below the saturation required for good regeneration of the zeolite.

It is believed the foregoing description conveys a good understanding of the objects and advantages of my invention. The appended claims have been drawn to cover all legitimate modifications and adaptations.

I claim:

1. A brine tank comprising an upright open top receptacle of appreciable depth, and an open bottom brine drum fitting freely in the bottom portion of the receptacle dividing the space in said receptacle transversely at an intermediate level into two compartments, namely, an upper salt compartment in which a dry top salt bed is adapted to be stored resting on top of said drum, and a lower brine compartment inside said drum, the drum having openings provided in the lower portion thereof and having at least one relatively large opening provided in the top thereof over which a cover is disposed in such close relation thereto as to support the salt bed but allow restricted fluid circulation between the top of the drum and the cover through said opening, and a single combined brine outlet and raw water supply inlet pipe communicating with the drum and adapted to supply water thereto.

2. A brine tank as set forth in claim 1 wherein said pipe extends downwardly into said brine drum through a hole provided in the cover, whereby to maintain the cover in register with the opening.

3. A brine tank as set forth in claim 1 wherein said pipe extends downwardly into said brine drum through a hole provided in the cover, whereby to maintain the cover in register with the opening, said pipe reaching a level spaced above the bottom of said receptacle, whereby to leave a sump therebelow for separation of non-soluble and foreign materials from the salt.

4. A brine tank as set forth in claim 1 wherein said pipe extends downwardly into the brine drum reaching to a level spaced from the bottom of said receptacle, whereby to leave a sump therebelow for separation of non-soluble and foreign materials from the salt.

5. A brine tank comprising an upright open-top receptacle of appreciable depth, and an open-bottom brine drum fitting freely in the bottom portion of the receptacle dividing the space in said receptacle transversely at an intermediate level into two compartments, namely, an upper salt compartment in which a dry top salt bed is adapted to be stored resting on top of said drum, and a lower brine compartment inside said drum, the drum having openings provided in the lower portion thereof annularly arranged with respect to said receptacle, and having other openings provided in the top thereof which are relatively restricted so that the top supports the salt bed but allows restricted fluid circulation therethrough, and brine outlet and raw water supply inlet pipe means communicating with the inside of said drum and adapted to supply water thereto.

6. A brine tank as set forth in claim 5, wherein said pipe means extends downwardly into the brine drum reaching to a level spaced from the bottom of said receptacle, whereby to leave a sump therebelow for separation of nonsoluble and foreign materials from the salt.

7. A brine tank as set forth in claim 5 including means for automatically limiting the water input when the water reaches a level in said receptacle slightly above the drum.

References Cited in the file of this patent
UNITED STATES PATENTS

| | | |
|---|---|---|
| 380,378 | Wiser | Apr. 3, 1888 |
| 1,063,707 | Lummus | June 3, 1913 |
| 1,800,894 | Mau | Apr. 14, 1931 |
| 1,892,331 | Courthope et al. | Dec. 27, 1932 |
| 2,281,140 | Courthope et al. | Apr. 28, 1942 |
| 2,402,636 | Kaufmann | June 25, 1946 |
| 2,576,315 | Swartz | Nov. 27, 1951 |
| 2,584,910 | Ohlwiler | Feb. 5, 1952 |
| 2,683,080 | Ottosson | July 6, 1954 |